United States Patent [19]  [11]  4,250,284
Delbouille et al.  [45]  Feb. 10, 1981

[54] PROCESS AND CATALYST COMPONENTS FOR THE POLYMERIZATION AND THE COPOLYMERIZATION OF OLEFINS

[75] Inventors: André Delbouille; Jean L. Derroitte, both of Brussels, Belgium

[73] Assignee: Solvay & Cie, Brussels, Belgium

[21] Appl. No.: 552,335

[22] Filed: Feb. 24, 1975

Related U.S. Application Data

[63] Continuation of Ser. No. 313,946, Dec. 11, 1972, abandoned, which is a continuation of Ser. No. 889,737, Dec. 31, 1969, abandoned.

[30] Foreign Application Priority Data

Jan. 6, 1969 [GB] United Kingdom ................... 706/69

[51] Int. Cl.$^3$ ......................... C08F 4/02; C08F 10/00
[52] U.S. Cl. ............................. 526/124; 252/429 C; 526/114; 526/121; 526/122; 526/125; 526/132; 526/133; 526/155; 526/348; 526/351; 526/352
[58] Field of Search .................. 252/429 C; 260/88.2, 260/93.7, 94.9 DA, 94.9 E; 526/124

[56] References Cited

U.S. PATENT DOCUMENTS

| | | | |
|---|---|---|---|
| 3,454,547 | 7/1969 | Delbouille et al. | 260/94.9 DA |
| 3,642,760 | 2/1972 | Backelmans et al. | 260/94.9 DA |
| 3,644,318 | 2/1972 | Diedrich et al. | 260/94.9 DA |

FOREIGN PATENT DOCUMENTS 6714024  4/1968  Netherlands .

Primary Examiner—Edward J. Smith
Attorney, Agent, or Firm—Pennie & Edmonds

[57] ABSTRACT

Polymerization and copolymerization is carried out in the presence of an improved transition metal based catalyst. The catalyst is obtained by activating with an organometallic compound, the solid product which results from the reaction of a halogen containing transition metal compound with an alkoxy metal compound of the formula $X_{m-n}M(OR)_n$ wherein M is at least one metal selected from the elements of Groups Ia, IIa, IIb, IIIa and VIIb of the Periodic Table, X is a monovalent inorganic radical, R is a monovalent hydrocarbon radical, m is the valence of M and n is an integer such that $1 \leq n \leq m$.

4 Claims, No Drawings

4,250,284

PROCESS AND CATALYST COMPONENTS FOR THE POLYMERIZATION AND THE COPOLYMERIZATION OF OLEFINS

This is a continuation of application Ser. No. 313,946, filed Dec. 11, 1972, which is a continuation of Ser. No. 889,737 filed Dec. 31, 1969, both now abandoned.

BACKGROUND OF THE INVENTION

The invention relates to an improved process for the polymerization and the copolymerization of olefins. The invention also concerns a novel catalyst component and a novel catalyst produced by activation thereof, which may be used for polymerization and a method for the preparation of the novel catalyst component.

Catalysts comprising the following components have been disclosed heretofore:

(1) an activator generally constituted by an organometallic compound (2) a solid catalyst component having at least on its surface active sites which are comprised of:
 (a) a compound of a transition metal belonging to Groups IVb, Vb or VIb of the Periodic Table wherein the compound perferably contains halogenated substituents;
 (b) chemically bound oxygen;
 (c) halide ions
 (d) a bivalent metal selected from magnesium, calcium, zinc, manganese, iron, nickel and cobalt.

The exact nature of the active sites of the solid catalyst component is not known precisely, but it has been assumed that the elements (a) and (d) are associated by means of oxygen.

The solid catalyst component (2) which becomes an effective polymerization catalyst, when combined with an activator is prepared by reacting an appropriate compound of a bivalent metal with a halogenated compound of a transition metal; this reaction is carried out in a medium of halogenated transition metal compound at a temperature of about 40° and 180° C.

Examples of compounds of bivalent metals which yield such solid catalyst components include hydroxyl poor oxygenated compounds; for instance, salts of carboxylic acids as disclosed in French Pat. No. 1,516,800 of Oct. 21, 1966 and its addition No. 93,816 of Sept. 1, 1967.

SUMMARY OF THE INVENTION

New solid catalyst components have been found which are useful solids of olefin polymerization catalysts. The solid catalyst component of the present invention is obtained by reacting a halogen containing transition metal compound with a compound of the formula $X_{m-n}M(OR)_n$ wherein X is an inorganic monovalent radical, M is at least one metal belonging to Groups Ia, IIa, IIb, IIIa and VIIb of the Periodic Table, R is a monovalent hydrocarbon radical, m is the valence of M and n is an integer such as $1 \leq n \leq m$. In the solid components, the compound of a transition metal is believed to be associated through oxygen to a compound of a metal M.

Activation of the resultant solid component with an organometallic compound yields a new catalyst useful for the polymerization and copolymerization of olefins. Surprisingly, the catalysts of the present invention have been found to have a catalytic activity substantially superior to the already high activity of previously disclosed supported catalysts.

According to the invention, the polymerization of olefins is carried out in presence of a catalyst constituted by an organometallic compound and solid catalyst component prepared by reacting a halogen containing compound of a transition metal with a compound $X_{m-n}M(OR)_n$ wherein M, X, R, m and n are as defined above.

DESCRIPTION OF THE PREFERRED EMBODIMENTS

In the formula $X_{m-n}M(OR)_n$, M is a metal belonging to Groups Ia, IIa, IIb, IIIa and VIIb and is selected most advantageously from sodium, potassium, lithium, magnesium, calcium, zinc, boron, aluminum and manganese.

The hydrocarbon monovalent radical R is a saturated or unsaturated radical comprising 1 to 20 carbon atoms, selected among the branched or unbranched alkyl radicals, cycloalkyl radicals which may contain substituents, the aryl, alkylaryl and arylalkyl radicals.

The inorganic monovalent radical X is selected preferably from hydroxyl or halide radical, i.e. chloride, bromide, iodide or fluoride.

Examples of compounds of formula $X_{m-n}M(OR)_n$ useful for the preparation of new polymerization catalysts are:

sodium potassium or lithium alkoxides, for instance sodium or potassium ethylate or methylate magnesium, calcium, zinc and manganese dialkoxides and diphenoxides and more particularly, magnesium methylate, ethylate, isopropylate, butylate, octylate dodecylate, cresylate, naphthylate, and benzylate, zinc ethylate, calcium ethylate and manganese ethylate boron and aluminum trialkoxides and triphenoxides and, more particularly, the triisopropylates of these metals.

Mixed alkoxides of two metals of Groups I to III may be used too, for instance the compounds of formulas $LI[Al(OR)_4]$, $Mg[Al(OR)_4]_2$, $Na_2[Mg(OR)_4]$, $Cd[Al(OC_2H_5)_4]_2$, and $Mg_3[Al(OC_2H_5)_6]_2$.

Other alkoxide compounds which may be used are the monoalkoxymagnesium halides, such as the monoalkoxymagnesium bromide and the ethoxymagnesium bromide and the methoxymagnesium chloride, the di- and monoalkoxyaluminum halides and particularly the diethoxyaluminum chloride and the monoethoxyaluminum dichloride, and the monoalkylmagnesium hydroxides such as $Mg(OH)(OCH_3)$ and the mono- and dialkoxyaluminum hydroxides.

The halogenated derivatives of transition metals useful for the preparation of the activated solids are chosen from the halides, the oxyhalides and the polyhaloalkoxides of metals of Groups IVb, Vb and VIb of the Periodic Table and more particularly, among the chlorinated derivatives of titanium, zirconium, vanadium and chromium, for instance $TiCl_4$, $TiBr_4$, $TiI_4$, $TiCl_3(OR)$, $VOCl_3$, $VCl_4$ and $CrO_2Cl_2$.

The preparation of the solid catalyst component by the reaction of the alkoxy compound with the halogenated compound of a transition metal must be carried out before contact with the organometallic compound, i.e. before contact with the activator.

It is well known to contact simultaneously an alkoxy derivative, a halogenated compound of a transition metal and an organometallic activator. However, such catalysts which have been disclosed by U.S. Pat. No.

2,956,993 of Dec. 22, 1955 assigned to Phillips Petroleum Co. have a very low activity.

According to the present invention, the solid catalyst component is prepared by contacting the alkoxy compound and the halogenated compound of a transition metal in the absence of moisture and, preferably, at a temperature higher than ambient, i.e., at about 40° to 210° C. The reaction is carried out either in the absence of solvent, in the pure halogenated compound when it is liquid under the reaction conditions, or in a solution of a solvent which is inert towards the reactants, for instance a saturated hydrocarbon or aromatic hydrocarbon and, most preferably, the latter.

The alkoxy compound may be a solid or a liquid.

When the alkoxy compound is solid, which is preferred for carrying out the invention, the conditions of this reactions are chosen so that a violent reaction is obtained whereby the solid alkoxy derivative is attacked and the reaction is sufficiently complete that the desired solid component is formed. For this reason a high temperature of reaction, preferably above 120° C., is chosen when the reaction is carried out in solution, and a high boiling point solvent such as xylene is generally selected.

When the reaction is carried out by suspending the solid alkoxy derivative in the liquid compound of a transition metal, lower temperatures may be used. However, the temperature is preferably selected between the boiling point of the liquid and a temperature of 80° C. below the boiling point.

The duration of the reaction is usually between about 5 and 240 minutes and preferably between 10 and 30 minutes. A longer reaction period does not improve the catalytic characteristics; on the contrary, and desirable characteristics may be reduced thereby. The modification of the solid is often accompanied by an exothermic phenomenom which occurs after a variable period depending on the conditions of the reaction; and the fact that heat is evolved indicates that the desired reaction has taken place. Because of this phenomenon, the reaction is always carried out under vigorous agitation.

The reaction is always accompanied by a profound modification of the alkoxy derivative. When a solid is used for instance, if its specific surface is low at the beginning, for example lower than 10 m.$^2$/g., it is increased after reaction to several times its initial value, for example more than 40 m.$^2$/g. and usually more than 100 m.$^2$/g.. Consequently, the physical state of the alkoxy compound at the beginning is not important to the catalytic characteristics of the solid catalyst component, since the physical state of the original solid material is substantially modified during the reaction.

This is an unexpected, surprising and essential feature of the invention since it has been found that the exceptionally high catalytic activity is due to the high specific surface of the resultant solid component.

It has been observed that the solid catalyst components which show the highest activity when activated with an organometallic compound are those which have a specific surface higher than 100 m.$^2$/g..

While the present invention is not bound to a particular theory, from a chemical point of view, the reaction appears to involve an at least partial exchange of alkoxy or phenoxy radicals of compound $X_{m-n}M(OR)_n$ with halogens of the transition metal compound, i.e. at least partial formation of a halide of the metal M and an alkoxyhalide of the transition metal. Part of the transition metal alkoxy halide is sometimes eliminated by dissolution in the reaction medium, however, the recovered solid catalyst component is thought to comprise at least an association of a halide of metal M and an alkoxyhalide of the transition metal.

Thus, in the case of magnesium ethylate reaction with titanium tetrachloride, the chemical reaction which is believed to take place at least partially may be explained as follows:

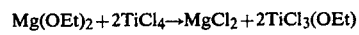

$$Mg(OEt)_2 + 2TiCl_4 \rightarrow MgCl_2 + 2TiCl_3(OEt)$$

The recovered solid is believed to be comprised, at least in part of magnesium chloride and titanium trichloroethylate.

In any event, it has been found that the catalyst component obtained as described above always contains a certain amount of the metal M which has been previously defined. The amount of the metal M in the present solid catalyst component is usually superior to 20 g./kg. and is generally comprised between 50 and 300 g./kg. depending on the particular metal. The reaction between the alkoxy compound $X_{m-n}M(OR)_n$ and the compound of transition metal is not merely a technique to prepare a haloalkoxide or an alkoxide of a transition metal by exchange of halogen and alkoxide groups.

It has been discovered that polymerization catalysts obtained by treating the solid catalyst component of the present invention with an organometallic compound have an activity at least several hundred times and most often several thousand times the activity of well known catalysts prepared from a haloalkoxide of a transition metal and an organometallic derivative, for instance an alkylaluminum as disclosed in the published German Patent Application DAS No. 1,271,400 of May 6, 1958 in the name of Chemische Werke Huels A.G.

The amount of transition metal in the present solid catalyst component varies with the nature of this metal and the conditions of the reaction. It is generally comprised between 20 and 300 g./kg. and preferably between 50 and 200 g./kg.

In addition to the chemical fixation of the transition metal on the alkoxy compound $X_{m-n}M(OR)_n$, a desirable increase of the content of halogen has been found to take place concurrently with the transformation of the alkoxy compound. The solid catalyst components generally have an atomic ratio X/T superior to 3 and generally comprised between 7 and 12, X being the halogen and T the transition metal.

The most interesting solid catalyst components of the present invention have a very high specific surface and an average content in transition metal. This preferable characteristic may be expressed by the titanium content in relation to the sq. meters of surface of the solid catalyst component, and is preferably between about 0.1 and 2 mg. per m.$^2$ of surface.

After the reaction of the alkoxymetal compound and the liquid halogenated transition metal compound, the resultant solid catalyst component may be extracted if desired with hot transition metal compound.

In any case, the solid catalyst component is separated from the reaction medium, for example, by filtration and washed with an inert solvent, preferably a saturated hydrocarbon such as hexane until the solvent is free from all traces of halogen.

After being washed, the solid catalyst component is contacted with the activator. The activating agent may be mixed with the solid catalyst component in the polymerization reactor, if desired, in presence of the polymerization diluent and possibly even in the presence of the olefin which is to be polymerized. Alternately, the activator may be added to the solid catalyst component before the polymerization. The conditions of such pre-contacting are generally not critical; for example, the temperature may be between ambient temperature and 80° C., for a period of about 5 to 60 minutes.

The organometallic compound used as the activator is selected from the derivatives of metals of Groups I, II, IIIa or IVa of the Periodic Table comprising at least one metal-carbon bond.

Among others, compounds of formula $M'R_qY_{p-q}$ may be used wherein M' is a metal of Groups Ia, IIa, IIb, IIIa or IVa, R is a hydrocarbon radical selected between the branched or unbranched alkyl radicals, alkenyl, cycloalkyl, aryl, alkylaryl or arylalkyl radicals containing 1 to 20 carbon atoms and Y is a monovalent radical selected from the halogens, hydrogen and alkoxy and dialkylamino radicals, p is the valence of M' and q an integer such that $1 \leq q \leq p$.

The trialkylaluminums such as trimethylaluminum, triethylaluminum, triisobutylaluminum, tri-n-octylaluminum, tri-n-dodecylaluminum and the halides of dialkylaluminums such as diethylaluminum chloride or fluoride are particularly useful.

However, the alkyl zinc, the alkyl lithium and the alkyl tin hydrides also yield catalysts having a high activity.

The amount of activator is not critical provided the activator is present in excess of the compound of a transition metal present in the polymerization medium. The atomic ratio M'/T wherein T is the transition metal and M' the metal of the activator must be superior to 2. It is preferably comprised between 5 and 300.

The polymerization and copolymerization of olefins may be carried out according to all the known techniques: continuously or discontinuously, in the gaseous state, that is in the absence of any liquid medium, or in presence of a dispersion medium in which the monomer is soluble. As dispersing liquid medium, an inert hydrocarbon, liquid under the conditions of the polymerization, or the monomers themselves, maintained liquid under their saturation pressure, may be used.

The process according to the invention may be advantageously applied to the homopolymerization of ethylene and to its copolymerization with other α-olefins such as propylene, butene-1 etc. In any case, the expensive and complicated purification of the catalyst residues may be eliminated entirely, owing to the extremely high productivity of the catalyst.

When ethylene is homopolymerized, the new solid catalyst component used in combination with trialkylaluminum such as trimethylaluminum, triethylaluminum or triisobutylaluminum, or with dialkylaluminum hydrides make possible the manufacture of polyethylenes having a relatively high melt index and a narrow molecular weight distribution, by carrying out the polymerization in presence of reduced quantities of hydrogen as a molecular weight controlling agent.

To manufacture lower melt index polymers, instead of the above mentioned trialkylaluminums, the activating compound is preferably trialkylaluminums having carbon chains of 8 to 20 carbon atoms, an dialkylaluminum halides or an alkylaluminum-diene polymer which is obtained by reacting trialkylaluminum or dialkylaluminum hydride with a diene.

The new solid catalyst components allow the manufacture of reduced specific weight polyethylenes when titanium tetraalkoxide is introduced into the polymerization medium in addition to the solid catalyst component of the present invention and an organometallic compound. In this event, a long chain trialkylaluminum or an alkylaluminum diene polymer is used preferably.

The invention is further described by means of the following Examples which illustrate the best modes currently contemplated for carrying out the present invention but which must not be construed as limiting the invention in any manner whatsoever.

EXAMPLES 1 and 2

(a) PREPARATION OF THE SOLID CATALYST COMPONENT

The reaction is carried out in a cylindrical reactor heated by a double jacket, provided with a stirrer and provided in its lower part with a sintered glass plate and with a releasing pipe. The reactor is provided with a cooling device and pipes which allow sweeping by means of an inert gas in its upper part.

Fifty ml. of $TiCl_4$ and 11.8 g. of magnesium ethylate are introduced into the reactor. The magnesium ethylate is prepared according to a known process from ethyl alcohol and magnesium scraps, the excess alcohol being eliminated by an azeotropic distillation with benzene.

The temperature is raised to 130° C. during 1 hour. The solid is filtered on the sintered plate then washed in the same recipient with hexane until all traces of chlorine have disappeared from the wash solvent. The solid is then dried under vacuum until its weight remains constant.

A catalytic solid is recovered which has the following analysis:

---
Mg:207 g./kg.
Ti: 41 g./kg.
Cl:628 g./kg.
C : 74 g./kg.
H : 16 g./kg.
0 : 34 g./kg. (estimated by difference)
---

(b) POLYMERIZATION

Polymerizations, the particular conditions and results of which are recorded in Table 1, have been carried out as follows:

Under a nitrogen cover in an 3 l. autoclave, the following is successively introduced:
1 l. pure dry hexane
an amount (as specified in Table 1) of organometallic compound in the form of a solution in hexane
the solid catalyst component.

The temperature of the autoclave is raised at 80° C., then hydrogen under a pressure of 4 kg./cm.$^2$ and ethylene under a pressure of 2 kg./cm.$^2$ are introduced. The polymerization is carried out for 2 hours under a pressure maintained at a constant value by adding ethylene continuously. After 2 hours, the autoclave is degased and the produced polymer is filtered and then dried.

TABLE 1

|  |  | Example 1 | Example 2 |
|---|---|---|---|
| Composition of the organometallic compound |  | Al (iC$_4$H$_9$)$_3$ | Al (C$_2$H$_5$)$_2$Cl |
| Amount of organometallic compound | g. | 1,000 | 1,000 |
| Amount of solid catalyst component | g. | 0.028 | 0.037 |
| M' Ratio (metal of the organometallic compound)/Ti |  | 215 | 240 |
| Amount of PE produced | g. | 144 | 63 |
| Catalytic activity g.PE/h./g.Ti and atm. C$_2$H$_4$ |  | 31,700 | 10,500 |
| Catalytic productivity g.PE/g. solid catalyst component |  | 5,140 | 1,700 |
| Melt index of the PE | g./10 min. | 28 | 1.0 |

COMPARISON EXAMPLES A AND B

For purposes of comparison, several experiments have been made with different catalysts based on alcoholates which were prepared by methods outside the scope of the present invention.

(A) TiCl$_3$(OC$_2$H$_5$)—Al(iC$_4$H$_9$)$_3$ Catalyst

The polymerization has been carried out according to the procedure of Example 1 but with the following reactants:

| TiCl$_3$(OC$_2$H$_5$):121 mg. |
| Al(iC$_4$H$_9$)$_3$:200 mg. |

Only traces of polyethylene were recovered after 2 hours.

(B) TiCl$_4$—Mg(OC$_2$H$_5$)$_2$—Al(iC$_4$H$_9$)$_3$ Catalyst

The method of Example 1 has been used, but with the successive introduction into the 3 l. autoclave of the following:

| 940 | mg. | of Al(ic$_4$H$_9$)$_3$ dissolved in hexane |
| 180 | mg. | of Mg(OC$_2$H$_5$)$_2$ |
| 300 | mg. | of TiCl$_4$ |

Corresponding to atomic ratios Al/Ti of 2 and Mg/Ti of 2.

After 2 hours of polymerization, 81 g. of polyethylene are recovered, corresponding to a catalytic activity of 270 g. PE/h. g.Ti atm.C$_2$H$_4$.

EXAMPLE 3 to 5

A series of solid catalyst components are prepared from magnesium ethylate obtained from methanol and metallic magnesium. In Table 2 the various conditions of preparation of the solid catalyst components and the results of the polymerization carried out with the resultant catalysts are recorded in Table 2.

TABLE 2

|  |  | Example 3 | Example 4 | Example 5 |
|---|---|---|---|---|
| Preparation of the Catalytic Solid |  |  |  |  |
| Amount of Mg(OCH$_3$)$_2$ | g. | 26.7 | 10.1 | 9.9 |
| Nature of the solvent |  | — | xylene | xylene |
| Amount of solvent | ml. | — | 200 | 200 |
| Amount of TiCl$_4$ | ml. | 100 | 52 | 51.2 |
| Temperature | °C. | 130 | 80 | 130 |
| Period of reaction | h. | 1 | 1 | 1 |
| Characteristics of the Solid Catalyst Component |  |  |  |  |
| Content of Mg | g./kg. | 147 | 138 | 182 |
| Content of Ti | " | 96 | 95 | 74 |
| Content of Cl | " | 574 | 559 | 625 |
| Content of C | " | 83 | 55 | 60 |
| Content of H | " | 20 | 15 | 16 |
| Specific surface | m$^2$/g. | 264 | 240 | 448 |
| Content of Ti based on 1 m.$^2$ of surface | mg. | 0.364 | 0.396 | 0.165 |
| Ratio Cl/Ti |  | 8 | 7.96 | 11.44 |
| Results of the Polymerization |  |  |  |  |
| Amount of Solid catalyst component used | mg. | 16 | 95 | 61 |
| Amount of Al (iC$_4$H$_9$)$_3$ used | mg. | 1320 | 200 | 93 |
| Amount of recovered polyethylene | g. | 62 | 43 | 190 |
| Catalytic activity g.Pe/h./g.Ti and kg./cm.$^2$ of C$_2$H$_4$ |  | 10,320 | 1200 | 42,600 |
| Catalytic productivity g.PE/g. solid catalyst component |  | 975 | 450 | 3120 |
| Melt index of the PE | g./10 min. | — | 9.9 | 54.6 |

EXAMPLES 6 to 9

A series of solid catalyst components are prepared from magnesium ethylate and various halogenated compounds of transition metals. The method used is the same as described in Example 1. The particular conditions of the polymerization and the results are recorded in Table 3.

The thus prepared solid catalyst component is characterized by the following analytical data:

TABLE 3

|  | Example 6 | Example 7 | Example 8 | Example 9 |
|---|---|---|---|---|
| Preparation of the Solid Catalyst Component |  |  |  |  |
| Amount of $Mg(OC_2H_5)_2$ g. | 10.5 | 10 | 20 | 20 |
| Nature of the solvent | xylene | xylene | — | — |
| Amount of solvent ml. | 150 | 150 | — | — |
| Composition of the transition metal compound | $TiCl_3(OC_2H_5)$ | $TiI_4$ | $VOCl_3$ | $VCl_4$ |
| Amount of transition metal compound g. | 18.3 | 71 | 183 | 182 |
| Temperature °C. | 130 | 130 | 126 | 148 |
| Period of reaction h. | 1 | 1 | 1 | 1 |
| Characteristics of the Solid Catalyst Component |  |  |  |  |
| Content of Mg g./kg. | 130 | 62 | — | 48 |
| Content of transition metal T g./kg. | 108 | 93 | 78 | 262 |
| Content of halogen X g./kg. | 423 | 752 | 599 | 613 |
| Ratio X/T | 5.3 | 3.1 | 11 | 3.4 |
| Specific surface m.$^2$/g. | 118 | 88 | — | — |
| Conditions of the Polymerization |  |  |  |  |
| Temperature °C. | 80 | 80 | 85 | 85 |
| Period of reaction h. | 2 | 2 | 1 | 1 |
| Pressure of ethylene kg./cm.$^2$ | 10 | 10 | 10 | 10 |
| Pressure of hydrogen kg./cm.$^2$ | 5 | 2 | 5 | 4 |
| Amount of solid catalyst component mg. | 84 | 92 | 147 | 55 |
| Amount of activator [$Al(iC_4H_9)_3$] mg. | 200 | 355 | 200 | 200 |
| Results of the polymerization test |  |  |  |  |
| Amount of polyethylene recovered g. | 60 | 76 | 181 | 89 |
| Catalytic activity g.PE/h./g.Ti and kg./cm.$^2$ $C_2H_4$ | 335 | 441 | 1580 | 620 |
| Catalytic productivity g.PE/g. solid catalyst component | 715 | 830 | 1230 | 1620 |
| Melt index of the PE g./10 min. | 0.32 | 1.0 | 10.4 | 3(2) |

(1) Test performed in an autoclave of 1.5 liter with 0.5 liter hexane
(2) This product was characterized also by an especially broad distribution of molecular weights which was evaluated by a Cd factor of 25 such as defined in French Patent 1,582,942 of August 26, 1968 in the name of Solvay et Cie.

EXAMPLES 10 to 15

A solid catalyst component is prepared from 50 ml. of $TiCl_4$ and 18.7 g. of magnesium phenate following the procedure of Examples 1 and 2 but at a temperature of 90° C. instead of 130° C. The operation is repeated by adding fresh $TiCl_4$ several times at 90° C.; then the product is washed with hexane.

The magnesium phenate had been prepared by reacting magnesium methylate with phenol in a solution of boiling xylene, the resultant methanol being eliminated by distillation.

| Mg | 144 g./kg. |
|---|---|
| Ti | 88 g./kg. |
| Cl | 605 g./kg. |
| C | 133 g./kg. |
| H | 20 g./kg. |
| O | 10 g./kg. (estimated by difference) |

Its specific surface is 217 m.$^2$/g. which corresponds to or content of Ti of 0.406 mg. per m.$^2$.

The polymerizations were performed as specified in Examples 1 and 2 and gave the results recorded in Table 4.

TABLE 4

|  | Example 10 | Example 11 | Example 12 | Example 13 | Example 14 | Example 15 |
|---|---|---|---|---|---|---|
| Composition of the organometallic compound | $Al(iC_4H_9)_3$ | $Al(C_2H_5)_2Cl$ | $AlCl_2(iC_4H_9)$ | $Zn(C_2H_5)_2$ | $Li(C_4H_9)$ | $Sn(C_4H_9)_3H$ |
| Amount of organometallic compound g. | 0.084 | 0.200 | 0.172 | 0.108 | 0.082 | 0.460 |
| Amount of catalytic solid g. | 0.023 | 0.041 | 0.131 | 0.048 | 0.035 | 0.086 |
| Ratio M'/Ti | 9.7 | 22 | 4.6 | 13 | 20 | 10 |
| Pressure of ethylene atm. | 2 | 2 | 24 | 2 | 2 | 2 |
| Pressure of hydrogen atm. | 4 | 4 | — | 4 | 4 | 4 |
| Time of reaction h. | 0.5 | 0.5 | 3 | 2 | 2 | 2 |
| Amount of recovered PE g. | 98 | 97 | 9 | 12 | 2 | 14 |
| Catalytic activity g.PE/h.g.Ti atm.$C_2H_4$ | 43,510 | 26,900 | 11.5 | 710 | 160 | 440 |
| Catalytic productivity g.PE/g. solid catalyst component | 4,200 | 2,360 | 69 | 240 | 57 | 163 |

TABLE 4-continued

|  | Example 10 | Example 11 | Example 12 | Example 13 | Example 14 | Example 15 |
|---|---|---|---|---|---|---|
| Melt index of the PE g./10 min. | 27.6 | 0.44 | — | 1.6 | — | 0.18 |

EXAMPLES 16 TO 22

In order to show the influence of the temperature of reaction on the characteristics of the solid catalyst component, a series of solid catalyst component has been prepared under identical conditions but at a varying temperatures and with various periods of reaction. The results of these experiments are given in Table 5.

The common conditions of these examples are:

One hundred ml. of distilled $TiCl_4$ are introduced into the reactor described in Examples 1 and 2.

The agitated system is turned on and 20 g. of $Mg(OC_2H_5)_2$ (commercial product of Dynamit Nobel) are slowly introduced.

When the introduction is finished, the fluid of the double jacket is circulated and heated at the determined temperature.

After the determined contact time, $TiCl_4$ is released through the sintered plate and the agitation is stopped.

The product is washed with hexane until all traces of chlorine have disappeared from the wash solvent.

The different catalytic solids thus obtained are used for polymerization under standard conditions: an autoclave of 1.5 liter is supplied successively with 0.5 liter hexane
100 mg $Al(iC_4H_9)_3$
the indicated amount of solid catalyst component.

The autoclave is then closed and heated to 85° C. Hydrogen under a pressure of 4 kg./cm.$^2$ and ethylene under a pressure of 10 kg./cm.$^2$ are introduced. The polymerization is stopped after 1 hour.

TABLE 5

| | Reaction with TiCl$_4$ | | Characteristics of the solid catalyst Component | | | | | Polymerization | | | |
|---|---|---|---|---|---|---|---|---|---|---|---|
| No. of the ex. | Temp. °C. | Period of reaction min. | Content of Ti g./kg. | Content of Cl g./kg. | Content of Cl g./kg. | Specific surface m.$^2$/g. | Content of Ti mg./m.$^2$ | Amount of solid catalyst component mg | Amount of PE g. | Catalytic activity g.PE/h.g. Ti kg./cm.$^2$ of C$_2$H$_4$ | Catalytic productivity g.PE/g. solid catalyst component |
| 16 | 60 | 15 | 60 | 392 | 180 | 41 | 1.46 | 10 | 103 | 17,200 | 10,300 |
| 17 | 90 | 15 | 83 | 628 | 169 | 250 | 0.33 | 6 | 151 | 30,200 | 25,200 |
| 18 | 100 | 15 | 80 | 621 | 164 | 321 | 0.25 | 4 | 138 | 42,400 | 34,600 |
| 19 | 130 | 15 | 49 | 627 | 208 | 369 | 0.13 | 3.8 | 141 | 74,000 | 37,600 |
| 20 | 130 | 5 | 89 | 616 | 163 | 376 | 0.24 | 5 | 22 | 4,800 | 4,400 |
| 21 | 130 | 30 | 99 | 625 | 166 | 413 | 0.24 | 5 | 188 | 37,600 | 37,600 |
| 22 | 130 | 120 | 171 | 577 | 103 | 96 | 1.78 | 6 | 140 | 13,700 | 23,400 |

The results show that, if all the other conditions are the same, the catalytic activity increases when the temperature of reaction is raised from 60° C. to 130° C. and that a maximum is reached when the period of reaction is about 15 minutes, the decrease being slow when the period of reaction increases above this value.

EXAMPLES 23 TO 31

Three solid catalyst components are prepared from magnesium ethylate in the conditions of Example 21 for products I and II and of Example 19 for product III. The thus-obtained products have the following characteristics:

| I. | Ti | 36 g./kg. |
|---|---|---|
| | Cl | 648 g./kg. |
| | Mg | 205 g./kg. |
| II. | Ti | 54 g./kg. |
| | Cl | 661 g./kg. |
| | Mg | 210 g./kg. |
| III. | Ti | 88 g./kg. |
| | Cl | 599 g./kg. |
| | Mg | 158 g./kg. |

These solid catalyst components are used for polymerization carried out under various conditions but according to the procedure of Examples 16 to 22. These conditions as well as the results of the polymerizations are given in Table 6.

TABLE 6

| Number of the example | Solid Catalyst Component Used | Amount of Solid Catalyst Component mg. | Composition of Activator | Amount of Activator mg. | Polymerization temperature °C. | Amount of PE produced g. | Melt index of the PE g./10 min. | Catalytic Activity g.PE/h.g. Ti kg./cm.$^2$ of C$_2$H$_4$ | Catalytic Productivity g.PE/g solid catalyst component |
|---|---|---|---|---|---|---|---|---|---|
| 23 | I | 16 | Al(iC$_4$H$_9$)$_3$ | 100 | 60 | 32 | 0.09 | 8,160 | 2,900 |
| 24 | I | 13 | " | 100 | 75 | 135 | 0.76 | 29,000 | 10,400 |
| 25 | I | 9 | " | 100 | 85 | 115 | 1.7 | 36,000 | 12,800 |
| 26 | I | 8 | " | 100 | 95 | 100 | 5.6 | 35,200 | 12,500 |
| 27 | II | 7 | Al(CH$_3$)$_3$ | 40 | 85 | 99 | 1.2 | 26,400 | 14,200 |
| 28 | II | 5 | Al(C$_2$H$_5$)$_2$H | 43 | 85 | 78 | 1.3 | 29,200 | 15,600 |
| 29 | I | 12 | Al(C$_2$H$_5$)$_2$Cl | 60 | 85 | 144 | 1.6$^1$ | 11,100 | 11,800 |
| 30 | III | 5 | polyisobutyl-aluminum-isoprene$^2$ | 74 | 85 | 117 | 1.3 | 27,600 | 23,400 |

TABLE 6-continued

| Number of the example | Solid Catalyst Component Used | Amount of Solid Catalyst Component mg. | Composition of Activator | Amount of Activator mg. | Polymerization temperature °C. | Amount of PE produced g. | Melt index of the PE g./10 min. | Catalytic Activity g.PE/h.g. Ti kg./cm.$^2$ of $C_2H_4$ | Catalytic Productivity g.PE/g solid catalyst component |
|---|---|---|---|---|---|---|---|---|---|
| 31 | III | 5 | Al(iC$_4$H$_9$)$_3$[3] | 100 | 85 | 112[4] | 9.0 | 26,800 | 22,400 |

[1]High load melt index (21.6 kg. instead of 2.16 kg.) [2]The isobutyl-aluminum-isoprene polymer used as activator is the product of the reaction of isoprene with triisobutyl-aluminum or diisobutylaluminum hydride, characterized by the ratio of the number of C$_5$ groups to the number of C$_4$ groups of 1.9.
[3]16 mg. of Ti(OC$_8$H$_{17}$)$_4$ are added to the polymerization medium.
[4]The thus-obtained polyethlene has a reduced density (0.944 g./cm.$^3$ instead of 0.967 g./cm$^3$ for comparable product manufactured in the absence of Ti(OC$_8$H$_{17}$)$_4$.).

EXAMPLE 32

Sodium methylate is prepared according to the well known techniques from methanol and metallic sodium, the excess of methanol being eliminated by distillation and the remaining traces of methanol by azeotropic distillation with hexane. 16.6 g. of this methylate are contacted with 50 ml. of TiCl$_4$ then the suspension is heated to 130° C. as described in Examples 1 and 2. After being washed with TiCl$_4$ and then with hexane, the thus-obtained solid catalyst component is dried until its weight remains constant. It has the following composition:

| Na | 339 g./kg. |
|---|---|
| Ti | 30 g./kg. |
| Cl | 600 g./kg. |
| C | 14 g./kg. |
| H | 4 g./kg. |
| O | 13 g./kg. (estimated by difference) |

The specific surface of this solid catalyst component solid is 46 m.$^2$/g. which corresponds to a content of 0.65 mg./m.$^2$.

Polymerization was carried out under the conditions of Examples 1 and 2, under 2 kg./cm.$^2$ of ethylene and 4 kg./cm.$^2$ of hydrogen, with 0.162 g. of triisobutylaluminum as activator and 0.101 g. of solid catalyst component renders after 2 hours 49 g. of a polyethylene of which melt index is 15 g./10 min.. The catalytic activity was 4040 g. PE/h./g. Ti and atm.C$_2$H$_4$ and the catalytic productivity, 490 g. PE/g. of solid catalyst component.

EXAMPLE 33

Aluminum isopropylate is prepared by reacting in a dry 2 liter flask swept with nitrogen, 231 ml. of isopropyl alcohol and 14 g. of aluminum in presence of a small amount of HgCl$_2$. The reaction starts immediately and is maintained by heating under reflux. After 1 hour the isopropyl alcohol in excess is eliminated. After that, the aluminum isopropylate is distilled under 6 mm. of Hg at about 150° C. The distillate crystallizes very slowly. It contains 133 g. of aluminum per kg.

Employing the same conditions as mentioned in Examples 1 and 2, 23.7 g. of this aluminum isopropylate are reacted with 50 ml. of TiCl$_4$. At the beginning of the reaction, precautions are taken in view of the exothermal nature of the reaction. After washing with hexane and drying until the weight remains constant, a product is recovered containing:

108 g. of Al per kg.
180 g. of Ti per kg.
363 g. of Cl per kg.
139 g. of C per kg.
24 g. of H per kg.
and 186 g. of O per kg. (estimated by difference).

0.042 g. of this solid catalyst component and 0.155 g. of Al(iC$_4$H$_9$)$_3$ are used in the polymerization of ethylene in the conditions of Examples 1 and 2. One manufactures thus 34 g. of a polyethylene characterized by a high load melt index of 1.8 g./10 min. The catalytic activity is 1,110 g. PE/h.g.Ti.atm.C$_2$H$_4$ and the catalytic productivity is 810 g.PE/g. of solid catalyst component.

EXAMPLES 34 TO 44

According to the procedure given in Example 1, a series of solid catalyst components is prepared from alkoxides of various metals having various structures. The data concerning these solid catalyst component and the characteristics of the polymerization according to Example 1 are recorded in the following Table 7.

TABLE 7

| No. of the Ex. | Alkoxide Composition | Method of preparation | Characteristics of the Solid Catalyst Component ||||||| 
|---|---|---|---|---|---|---|---|---|---|
| | | | Content of Ti mg./g. | Content of metal M mg./g. | Content of Cl mg./g. | Content of C mg./g. | Content of H mg./g. | Specific surface m$^2$/g. | Content of Ti mg./m.$^2$ |
| 34 | Mg(OnC$_8$H$_{17}$)$_2$ | (CH$_3$O)$_2$Mg + nC$_8$H$_{17}$OH | 72 | 145 | 598 | 124 | 23 | * | * |
| 35 | Mg(OCH$_2$C$_6$H$_5$)$_2$ (benzylate) | (CH$_3$O)$_2$Mg + C$_6$H$_5$CH$_2$OH | 154 | 70 | 430 | 264 | 34 | 149 | 1.03 |
| 36 | Mg(OC$_6$H$_{11}$)$_2$ (cyclohexylate) | (CH$_3$O)$_2$Mg + C$_6$H$_{11}$OH | 114 | 150 | 559 | 108 | 16 | 256 | 0.445 |
| 37 | Mg(OC$_6$H$_4$CH$_3$)$_2$ (p-cresate) | (CH$_3$O)$_2$Mg + p-CH$_3$C$_6$H$_4$OH | 83 | 126 | 575 | 162 | 18 | 210 | 0.395 |
| 38 | Mg(OH)(OCH$_3$) | (CH$_3$O)$_2$Mg + H$_2$O | 68 | 199 | 620 | 57 | 15 | 438 | 0.155 |
| 39 | MgCl(OC$_6$H$_5$) | (C$_2$H$_5$)MgCl + C$_6$H$_5$OH | 52 | 186 | 686 | 65 | 11 | 156 | 0.333 |
| 40 | Ca(OC$_2$H$_5$)$_2$ | Ca + C$_2$H$_5$OH/NH$_3$ liq. | 33 | 308 | 594 | 35 | 12 | 134 | 0.246 |
| 41 | Mn(OC$_2$H$_5$)$_2$/NaCl | MnCl$_2$ + NaOC$_2$H$_5$ | 25[(1)] | — | 577 | 19 | 4 | 82 | 0.328 |
| 42 | [Al(OC$_2$H$_5$)$_6$]$_2$Mg$_3$ | C$_2$H$_5$OH + Al + Mg | 77 | Mg : 118<br>Al : 62 | 605 | 63 | 13 | 506 | 0.152 |
| 43 | [Al(OC$_2$H$_5$)$_4$]$_2$Mg | C$_2$H$_5$OH + Al + Mg | 78 | Mg : 133 | 607 | 101 | 20 | 442 | 0.177 |

TABLE 7-continued

| | | | | | | | | | |
|---|---|---|---|---|---|---|---|---|---|
| 44 | Ca.Mg(OC$_2$H$_5$)$_4$ | C$_2$H$_5$OH + Ca + Mg | 35 | Al : 19<br>Mg : 97<br>Ca : 158 | 622 | 110 | 29 | 292 | 0.120 |

$^{(1)}$Period of reaction carried out in refluxing xylene such as in Example 5
*not determined

| | | | | POLYMERIZATION | | | |
|---|---|---|---|---|---|---|---|
| No. of Ex. | Amount of solid catalyst component mg. | Amount of Al(iC$_4$H$_9$)$_3$ mg. | Amount of recovered PE g. | Melt index of the pE g./10 min. | Catalytic Activity g.PE/h.g. Ti kg./cm.$^2$ of C$_2$H$_4$ | Catalytic productivity g.PE/g. solid catalyst-component | |
| 34 | 81 | 122 | 109 | 23.7 | 18,800 | 1,350 | |
| 35 | 38 | 121 | 99 | 3.1 | 4,280 | 2,600 | |
| 36 | 35 | 82 | 152 | 12.0 | 9,600 | 4,350 | |
| 37 | 17.5 | 134 | 159 | 80 | 49,500 | 9,100 | |
| 38 | 51 | 100 | 139$^{(1)}$ | 31.5 | 20,280 | 2,700$^{(1)}$ | |
| 39 | 7.4 | 200 | 137 | 7.7 | 90,000 | 4,630 | |
| 40 | 131 | 200 | 134 | 1.7 | 7,840 | 1,020 | |
| 41 | 107 | 100 | 95 | 14 | 4,680 | 890 | |
| 42 | 32 | 100 | 116 | 15.4 | 12,000 | 3,630 | |
| 43 | 4.5 | 50 | 196 | 13 | 105,000 | 43,500 | |
| 44 | 27 | 40 | 158 | 23 | 42,000 | 5,850 | |

$^{(1)}$Period of reaction: 1 hour instead of 2.

EXAMPLE 45

The solid catalyst component of Examples 10 to 15 is used for copolymerizing ethylene and propylene.

An autoclave of 3 liters, dried and continuously swept by a propylene flow, is supplied continuously with 200 mg. of triisobutylaluminum in the form of a solution in hexane containing 200 g./l., 7 mg. of a solid catalyst component based on TiCl$_4$ and magnesium phenate such as mentioned in Examples 10 to 15, containing 88 g. of Ti per kg. and previously contacted with 40 mg. of triisobutylaluminum in form of a solution in hexane at 80° C. containing 40 g./l.. Hydrogen under a pressure of 0.2 kg./cm.$^2$ and 500 g. of liquid propylene are supplied. The temperature is raised to 40° C. and ethylene is added in order to raise the total pressure to 19.3 kg./cm.$^2$. The polymerization is carried out for 2 hours. The pressure is maintained constant by introducing ethylene continuously. The unreacted monomers are then degased. 322 g. of a rubbery ethylene-propylene copolymer are thus recovered. This corresponds to a catalytic activity of 268,000 g. of copolymer per hour and g. of Ti present in the catalyst.

EXAMPLE 46

The same solid component catalyst as in Example 45 is used to homopolymerize propylene.

An autoclave of 3 liters is supplied successively with:
1 l. of pure dry hexane
300 mg. of triisobutylaluminum dissolved in hexane.
84 mg. of the solid catalyst component previously reduced such as in Example 45.

The temperature is raised to 60° C. The propylene is injected in order to adjust the partial pressure of propylene to 5.63 kg./cm.$^2$. The polymerization is carried out during 90 minutes and 346 g. of solid polypropylene are recovered, corresponding to a catalytic activity of 30,600 g. PP/h.g.Ti in the catalyst.

What we claim and desire to secure by Letters Patent is:

1. In a process for the polymerization or copolymerization of olefins in the presence of a catalyst consisting essentially of a trialkylaluminum and a solid catalyst component having at least at the surface thereof groups derived from the compound titanium tetrachloride, the improvement which comprises carrying out said polymerization or copolymerization in the presence of a catalyst wherein the solid catalyst component is obtained by reacting a titanium tetrachloride with a magnesium dialkoxide in the absence of solvent and at a temperature higher than ambient temperature, separating the solid component formed from the reaction medium and washing the same with an inert solvent until the solvent is free from all traces of chlorine, and wherein the trialkylaluminum compound is present in a molar excess of at least 2 with respect to the titanium metal present in the solid catalyst component.

2. The process of polymerization or copolymerization according to claim 1 wherein the olefin is selected from the group consisting of ethylene, ethylene-propylene mixtures and ethylene-butene-1 mixtures.

3. In a process for the polymerization or copolymerization of olefins in the presence of a catalyst comprising a trialkylaluminum and a solid catalyst component, the improvement which comprises carrying out said polymerization or copolymerization in the presence of a catalyst wherein the solid catalyst component is obtained by reacting titanium tetrachloride with magnesium dialkoxide in the absence of moisture and solvent and at a temperature higher than ambient temperature and the medium for said reaction being said pure titanium tetrachloride.

4. The process according to claim 3 wherein the olefin is selected from the group consisting of ethylene, ethylenepropylene mixtures and ethylene-butene-1 mixtures.

* * * * *